July 24, 1962   T. S. SIMPSON, JR   3,045,387
BAIT STATION FOR RATS AND THE LIKE
Filed Feb. 17, 1960   2 Sheets-Sheet 1

INVENTOR.
THEODORE S. SIMPSON, JR.

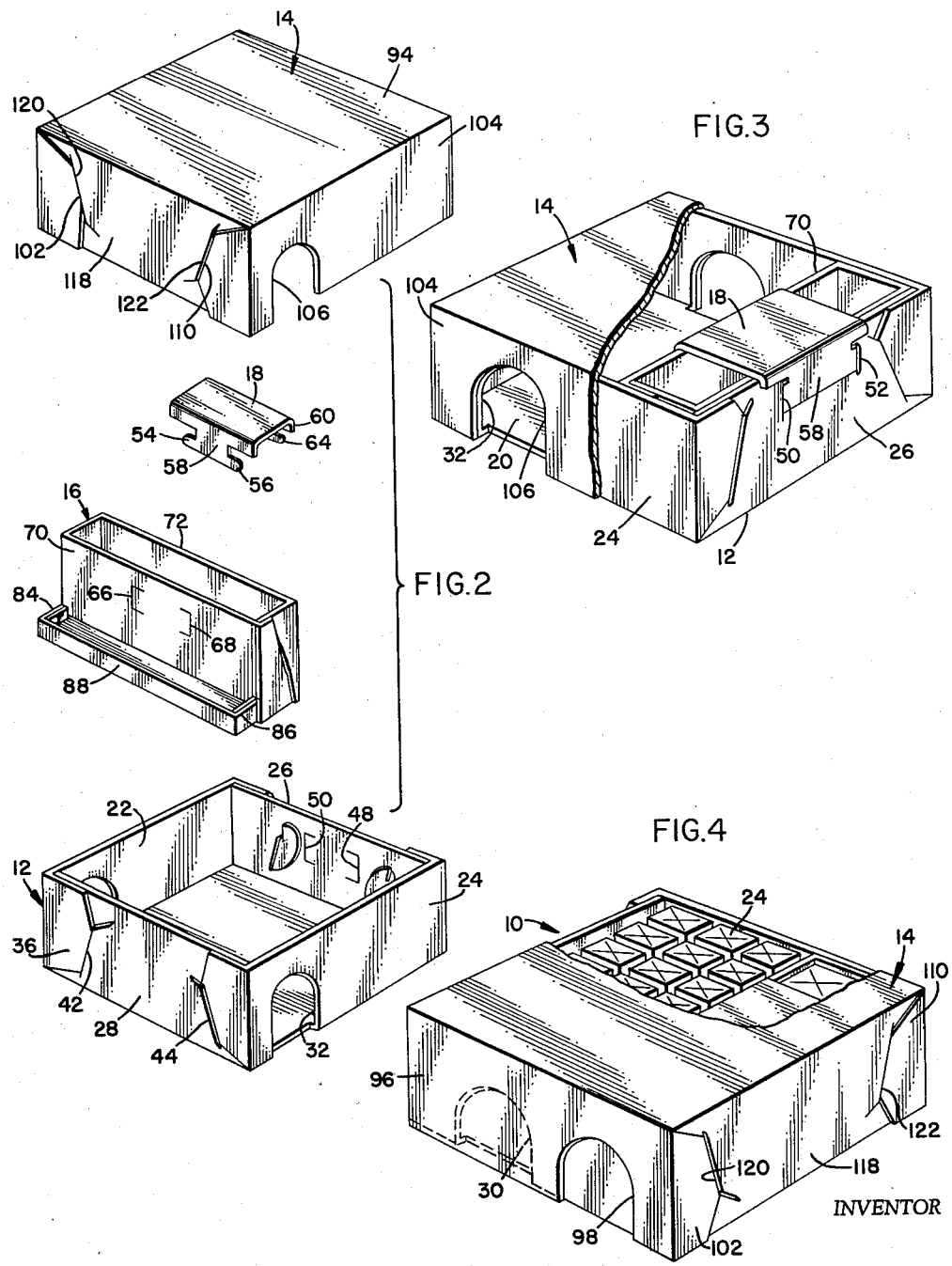

United States Patent Office 3,045,387
Patented July 24, 1962

3,045,387
BAIT STATION FOR RATS AND THE LIKE
Theodore S. Simpson, Jr., West Palm Beach, Fla., assignor to ABC Chemical Corp.
Filed Feb. 17, 1960, Ser. No. 9,279
5 Claims. (Cl. 43—131)

This invention relates to containers for toxicants for rodents, such as rats and the like, and in particular a container having cells for toxicants or packages of toxicants therein, which, in the closed position, provides a carton for storage or transportation, and which is arranged to be opened to provide a bait station having cells or packages of toxic products in one portion and a rodent feeding trough in another portion.

The purpose of this invention is to provide a combination bait and storage carton in which toxic bait may be merchandized, and from which the bait may be consumed by rats and the like.

Various types of toxic bait feeders have been used for rats and other rodents and although they are used successfully it is difficult to maintain fresh feed in the troughs or containers. Where the feed remains in the troughs or hoppers for some time it is not palatable and must be removed and replaced with fresh feed. For this reason it is desirable to place relatively small quantities of feed in the hoppers and this requires carrying a supply of feed from one feeder to another.

With this thought in mind this invention contemplates a bait station wherein open troughs or feed hoppers are provided in combination with a supply of toxic feed so that it is only necessary for an attendant to travel from one station to another and place feed from a storage container in a feed hopper or trough.

The object of this invention is, therefore, to provide a rodent toxic bait feeder in which storage space is provided for fresh feed.

Another object of the invention is to provide a toxic bait station including a feeding area and a storage area in which the complete station is made of inexpensive material, such as waxed cardboard, or the like.

Another important object of the invention is to provide a bait station for rodents and the like, in which the station may be stored and shipped flat, and readily set up for use.

It is yet another object of the invention to provide a bait station having a feed trough and parcels of toxic bait in which the complete assembly is nested into a compact package for storage, distribution, and sale.

A further object of the invention is to provide a bait station having storage compartments and a feed hopper in which the complete assembly is stamped from sheet material.

A still further object is to provide a bait station for rodents and the like in which the station is of simple and economical construction.

With these and other objects and advantages in view the invention embodies a base having a rectangular-shaped panel with flaps providing side and end walls designed to be folded upwardly from edges of the panel, a trough having a back with end flaps and a front panel extended from ends thereof, and a bottom with an outer side, and with end flaps designed to fold upwardly therefrom, a trough anchoring clip, and a top with a rectangular-shaped panel similar to the base panel and having downwardly extended side and end flaps extended from edges thereof.

Other features and advantages of the invention will appear from the following description taken in connection with the drawings, wherein:

FIGURE 2 is an exploded view showing the individual parts of the bait station with the parts folded.

FIGURE 3 is a perspective view showing the parts of the bait station assembled in an operative position wherein the rodent passage openings in the top and base are aligned, and wherein part of the top or cover is broken away to show the anchoring clip for retaining the feed trough assembly in position in the station.

FIGURE 4 is an assembly view showing the bait station in the storing and shipping position wherein the rodent passages in the cover and base are not in registering relation, and in this view the cover is broken away showing the toxic bait storage containers in the carton.

Figure 1:
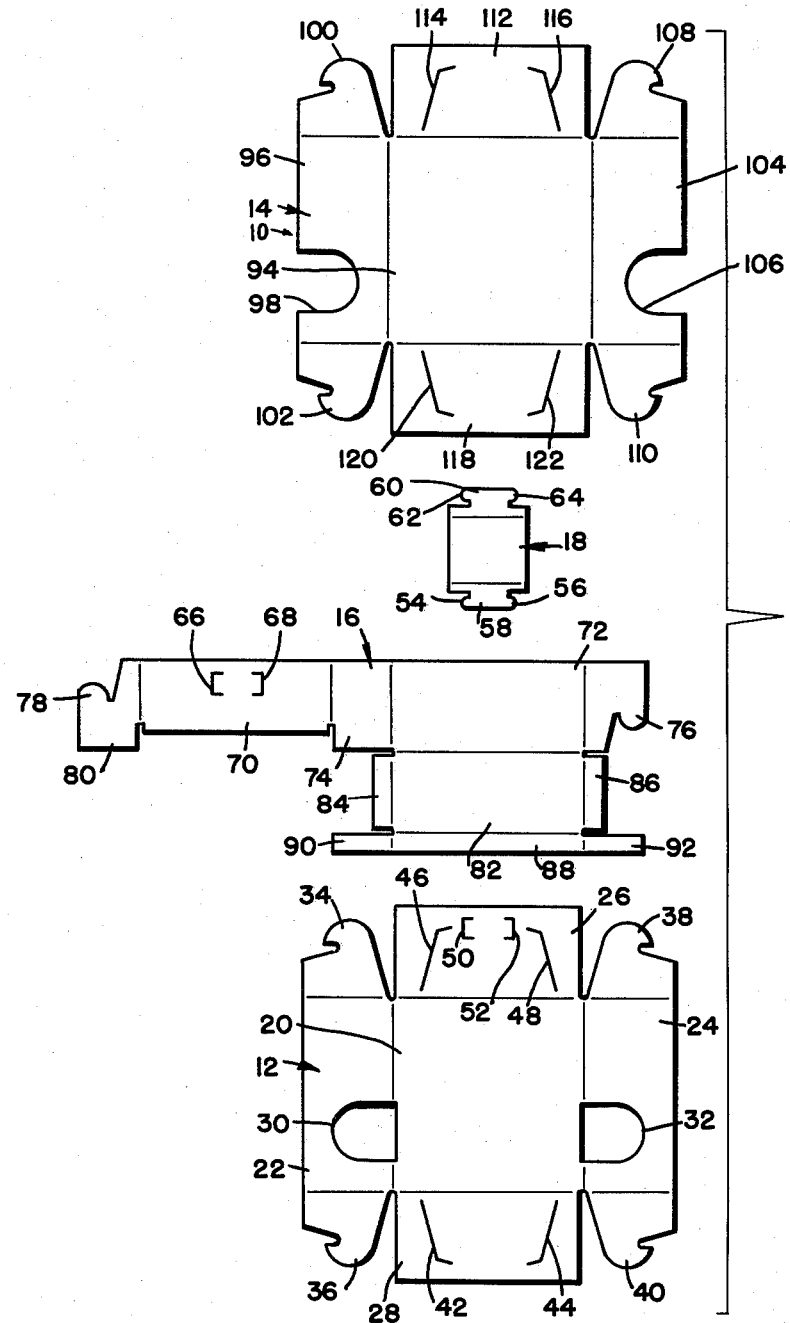
FIGURE 1 is an exploded view showing the top, base, feed trough, and trough anchoring clip, as stamped from sheet material.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings and in the following specification, the same reference characters are used to designate the same parts and elements throughout, and in which the numeral 10 refers to the invention in its entirety, numeral 12 indicating a base, numeral 14 indicating a cover, numeral 16 indicating a trough, and numeral 18 an anchor clip for retaining a feed trough in position in the bait station.

The base 12 is formed with a rectangular-shaped panel 20 having flaps 22 and 24 providing side walls, and flaps 26 and 28 providing end walls. The side walls are formed with entrance openings 30 and 32, and the wall 22 is provided with hooks 34 and 36. The wall 24 is provided with similar hooks 38 and 40, and the end wall 28 is provided with slits 42 and 44 that are positioned to receive the hooks 36 and 40. The wall 26 is also provided with similar slits 46 and 48 that are positioned to receive the hooks 34 and 38, respectively. The wall 26 is also provided with channel-shaped slits 50 and 52 that are positioned to receive tabs 54 and 56 of a tongue 58 of the anchor clip 18. The opposite tongue 60 of the anchor clip 18 is provided with tabs 62 and 64 that are positioned to be secured in slits 66 and 68 of a front wall 70 of the trough 16.

The front wall or panel of the trough is connected to the back 72 thereof by a panel 74 and the opposite end of the back is provided with a hook 76 that coacts with a hook 78 of a flap 80 on the end of the front panel 70 to retain the storage portion of the trough assembled. The back 72 extends from a bottom 82 having flaps 84 and 86 on the ends and a flap 88 with tabs 90 and 92 on the ends on one side. The flaps 84 and 86 fold upwardly and the tabs 90 and 92 fold against the flaps.

The cover 14 includes a rectangular-shaped panel 94 similar to the panel 20 of the base, a side wall 96 having an entrance opening 98 therein and hooks 100 and 102 extended from the ends, a side wall 104 having an opening 106 therein and hooks 108 and 110 extended from the ends, an end wall 112 having slits 114 and 116 for receiving the hooks 100 and 108, respectively, and an end wall 118 having slits 120 and 122 for receiving the hooks 102 and 110 respectively, on one end.

With the cover, base, and trough folded, as illustrated in FIGURE 2, and with the anchoring clip retaining the trough in position in one side of the base with the openings 30 and 32 of the side walls of the base in registering relation with the openings 98 and 106 of the cover; rats and the like may pass through the bait station and eat toxic products from the trough. An additional supply of the products may be stored in containers or parcels 124 in the storage portion of the trough.

The cover may also be turned to the position shown in FIGURE 4 whereby the entrance openings are not in registering relation and in this assembly the products are substantially sealed so that they remain fresh indefinitely.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish, and that it will find an important place in the art to which it appertains when once placed on the market.

It is thought that persons skilled in the art to which the invention relates will be able to obtain a clear understanding of the invention after considering the description in connection with the drawings.

Changes in shape, size, and arrangement of details and parts such as come within the purview of the invention claimed may be resorted to in actual practice, if desired.

Having now described the invention that which is claimed to be new and desired to be procured by Letters Patent, is:

1. A bait station comprising a base including a horizontally disposed panel having side and end walls extended upwardly therefrom, a trough, and a cover also including a horizontally disposed panel and having side and end walls depending therefrom, the trough having bait feed and storage sections therein, and the walls of the base and cover having openings therein, the openings of the walls of the cover being offset in relation to the openings of the walls of the base with the cover in one position, and in registering relation with the openings of the walls of the base with the cover in another position providing a passage through the station, the feed section of the trough being open to said passage, and an anchor clip for retaining the trough in position in the base.

2. A toxic bait feeder comprising a folding base having side and end walls and said side walls having rodent receiving openings therein, a folding trough positioned in the base and exposed to rodents passing through said openings, and a cover having a horizontally disposed panel with depending side and end walls and having rodent receiving openings in the side walls positioned over the trough and base, the rodent receiving openings in the side walls of the cover being in registering relation with the rodent receiving openings of the side walls of the base with the cover in one position and offset in relation to said openings with the cover in another position, and an anchor clip for retaining the folding trough in position on the base.

3. A toxic product feeder comprising a base including a rectangular-shaped panel with upwardly extended side and end walls, the side walls having rodent receiving openings therein, a cover having a panel similar to the panel of the base and having depending side and end walls positioned over corresponding walls of the base, the side walls of the cover having openings therein and said openings of the side walls being, selectively, in registering relation with the openings of the side walls of the base or offset in relation to said openings in the side walls of the base, and a feed trough in said base.

4. In a toxic bait feeder, the combination which comprises a base having upwardly extended side and end walls with rodent passages through the side walls, a cover having depending side and end walls and said side walls having rodent passages therethrough, the passages of the side walls of the cover being positioned to register with the passages of the side walls of the base, a feed hopper having storage compartments in combination therewith positioned in the base, and an anchoring clip for retaining the feed hopper in position in the base.

5. In a bait station, the combination which comprises a base including a rectangular-shaped panel with upwardly extended side and end walls, the side walls having rodent receiving openings therein and hooks extended from ends thereof and the end walls having slits to receive the hooks therein for retaining the side and end walls in upwardly disposed positions, a cover including a rectangular-shaped panel with depending side and end walls, the side walls of the cover having rodent receiving openings therein and hooks extended from ends thereof and the end walls of the cover having slits therein to receive the hooks of the side walls for retaining the side and end walls in folded positions, a folding trough having a feed hopper in the lower portion and storage parcels in one side in said base, and a folding anchoring clip for retaining the trough in position in the base.

References Cited in the file of this patent

UNITED STATES PATENTS

| | | |
|---|---|---|
| 1,086,610 | Nunes | Feb. 10, 1914 |
| 2,345,000 | Newsom | Mar. 28, 1944 |